United States Patent [19]

Sack et al.

[11] 4,168,810

[45] Sep. 25, 1979

[54] NOVEL LOCKING MECHANISM AND REEL FOR RETRACTOR

[75] Inventors: John J. Sack, Bloomfield Hills; Arduino Colasanti, East Detroit; Robert L. Stephenson, Sterling Heights, all of Mich.

[73] Assignee: Allied Chemical Corporation, Morris Township, Morris County, N.J.

[21] Appl. No.: 908,307

[22] Filed: May 22, 1978

[51] Int. Cl.² ............... A62B 35/02; B65H 75/48
[52] U.S. Cl. ............... 242/107.4 A; 242/107.4 B
[58] Field of Search ............... 242/107.4 R–107.4 E; 297/388; 280/744–747; 188/82.77

[56] References Cited

U.S. PATENT DOCUMENTS

| 3,698,657 | 10/1972 | Kirchhoff et al. | 242/107.4 B |
| 4,084,765 | 4/1978 | Bonnaud | 242/107.4 B |

Primary Examiner—Harvey C. Hornsby
Assistant Examiner—John M. Jillions
Attorney, Agent, or Firm—Patrick L. Henry

[57] ABSTRACT

An automobile retractor comprising: (a) a base (6); (b) a winding reel mounted for rotation on said base (6), said winding reel comprising a cylindrical hollow tube (12) having a slot (36) extending substantially along the length thereof, said slot having a first edge (34) and a second edge (35); (c) a locking dog (23) having teeth (39) and being mounted on the external peripheral surface of tube (12) for rotation relative thereto; (d) a locking ring (21) on base (6) disposed in potential mating relationship with locking dog (23); (e) locking dog (23) having an opening (28) therein and a projection (29) into opening (28), opening (28) fitting over one end of tube (12) with the projection (29) fitting into mating relationship with slot (36); (f) at least a significant portion (37) of the inner surface of said opening having a configuration that conforms with the outer peripheral surface of tube (12); (g) actuating ratchet wheel (43) rotatably mounted concentrically with respect to tube (12) and being connected to said locking dog via pin (45) and slot (49) whereby movement of said tube relative to said wheel causes the locking dog to rotate relative to said connection point and into locking engagement with said locking ring.

10 Claims, 6 Drawing Figures

NOVEL LOCKING MECHANISM AND REEL FOR RETRACTOR

FIELD OF THE INVENTION

This invention relates to a novel locking mechanism for a retractor, more particularly an emergency locking retractor for seat belts.

DESCRIPTION OF THE PRIOR ART

Reel type seat belt retractors, which allow extension of the belt in response to a pull under normal operating conditions, but which sense a sudden pull on the belt or deceleration of the vehicle as may occur in an accident to lock the reel against further belt extension, provide a number of advantages over alternate forms of retractors. They allow the belt system to be used by occupants of different size without adjustment, and allow the occupant to move freely in his seat without releasing the belt or causing the belt to tighten on the occupant as automatic locking systems do. Several factors tend to complicate the retractors of this type and/or reduce their reliability. There is the antithetical design requirement that a relatively small force actuate the locking mechanism which must withstand the very high forces generated by the impact of the moving occupant's body in a sudden vehicle deceleration. Another design problem relates to the fact that the reel must be stopped while it is moving relatively rapidly and locking parts do not always meet in the same position.

One known type of emergency locking retractor employs a rotatable flywheel supported on the reel urged by a spring to move with the reel in a web extending direction. If the reel accelerates relatively slowly, as it does in normal usage, the forces required to overcome the inertia of the flywheel will not be sufficient to compress the spring and the flywheel will rotate with the reel; however, when the reel is rapidly accelerated as by the occupant's body moving forward rapidly in the seat, the inertia forces cause the flywheel to slip relative to the reel, comressing the spring. A locking dog is supported on the reel and articulated to the flywheel so that the locking dog moves outward radially in response to relative motion between the two and engages an internal circular ratchet surface formed on a member which is fixed to the reel base side wall. This engagement locks the reel against further rotation. In retractors of this design, the dog must be relatively lightweight so the flywheel is well balanced, yet the dog must withstand the impact of its engagement with the stationary ratchet and absorb the forces which restrain the occupant's body against forward motion. Since the dog may move outwardly at any angular position of the reel, difficulty is encountered in designing the dog and ratchet to withstand the large impact forces. This type of retractor is exemplified in U.S. Pat. Nos. 3,416,747 and 3,955,774, and French Pat. No. 2,279,430, filed July 25, 1975.

SUMMARY OF THE INVENTION

It is an object of this invention to provide a simple, strong and reliable reel shaft locking mechanism combination for retractors, which is economical and easy to fabricate and assemble.

In summary, the invention comprises a device comprising:
 (a) a base;
 (b) a winding reel comprising a generally cylindrical hollow tube mounted for rotation on said base and having a slot extending substantially along the length thereof, said slot having a first edge and a second edge;
 (c) a locking dog having teeth and being mounted adjacent the external peripheral surface of said tube for rotation relative thereto;
 (d) a locking ring on said base disposed in potential mating relationship with said locking dog;
 (e) said locking dog having an opening therein and a projection into said opening, said opening fitting over one end of said tube with the projection fitting into mating relationship with said slot;
 (f) at least a significant portion of the inner surface of said opening having a configuration that conforms with the outer surface of said tube;
 (g) actuating means rotatably mounted with respect to said tube and being connected to said locking dog at a point radially spaced from the axis of the reel and remote from said projection whereby movement of said tube relative to said wheel causes the locking dog to rotate relative to said locking ring.

A presently preferred embodiment comprises an emergency locking seat belt retractor comprising:
 (a) a base including upstanding side walls having plastic bearings mounted thereon to provide bearing surfaces;
 (b) a winding reel comprising a cylindrical hollow tube mounted for rotation on said bearings having a slot extending substantially along the length thereof, said slot having a first edge and a second edge;
 (c) a shaft extending through the center of said tube, and secured against rotation relative to said reel;
 (d) a spring and cover mounted on one of said side walls; said spring being articulated to said shaft to urge the shaft, reel and belt into the retracted rolled up condition;
 (e) a locking dog having a plurality of teeth on the external surface thereof and having an opening therein, said opening being defined by a generally arcuate surface, interrupted by: (i) a projection having concave sides and rounded edges at the top thereof and its juncture with said arcuate surfaces, and (ii) a bearing surface remote from said projection and of essentially the same radius as the peripheral surface of said tube;
 (f) a locking ring mounted on the second of said side walls and having teeth on the internal surface thereof for mating relationship with said teeth of said locking dog;
 (g) said locking dog being mounted adjacent the peripheral surface of one end of the tube with the projection fitting into mating relationship to said slot;
 (h) an actuating ratchet wheel rotatably mounted on said shaft for rotating movement relative to said locking dog; a pivotal connection between said locking dog and said actuating ratchet wheel; the pivotal connection on the locking dog being at a point radially external to the outer peripheral surface of the tube and remote from the projection, whereby rotating movement of the tube relative to said actuating ratchet wheel causes one edge of said slot to engage the projection and move said locking dog about said pivotal connection into locking relationship with the locking ring; and at the point of locking, the peripheral surface of the tube comes into mating relationship with said bearing surface to provide additional force against said locking dog to maintain it in locked relationship with said locking ring, said relative movement being caused by a retarded movement of said actuating means caused by the inertia thereof relative to reel tube accelerations and/or by an inertial sensor being actuated by deceleration of the vehicle to lock said actuating means against further rotational movement.

The hollow tube is simple and easy to fabricate by stamping or rolling from flat sheet steel. The locking dog of the invention may be stamped out from flat sheet stock also and the whole retractor is easily assembled from one side in a stacking type of assembly that is susceptible of automated assembly.

DETAILED DESCRIPTION

Figure 1:
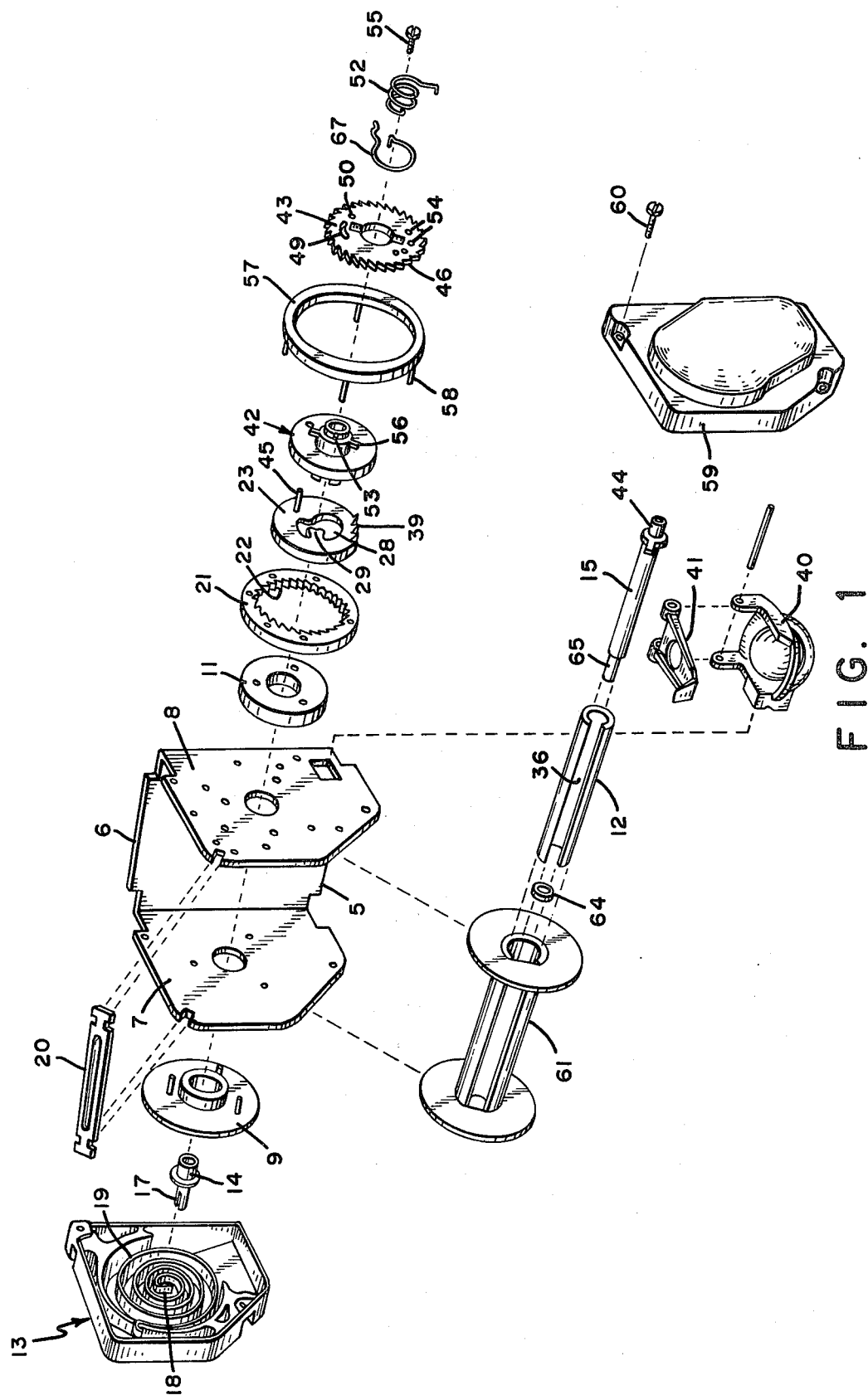
FIG. 1 is an exploded assembly view of the locking mechanism of the invention.

Referring to FIG. 1, the retractor 5 comprises a base 6, including upstanding side walls 7, 8. On the exterior of the side walls are mounted spacer bearings 9 and 11 designed to provide bearing surfaces for the winding reel tube 12. On retractor side wall 7, there is secured a spring and lever assembly 13 adjacent bearing 9. Arbor 14 is secured inside the end of tube 12 against rotation relative thereto and onto shaft 15. Arbor 14 has a slot 17 adapted to receive the inner end 18 of spring 19, thereby always urging the reel tube 12 in the belt rewind direction.

The side walls 7, 8 are secured in rigid spaced relationship by tie bar 20.

A locking ring 21 having internal teeth 22 is secured to side wall 8 adjacent bearing 11. The locking dog 23 is mounted adjacent the peripheral surface on tube reel 12. Locking dog 23 is actually supported by the interaction of the slot 36, projection 29, pin 45, slot 49 and spring 67.

Figure 4:
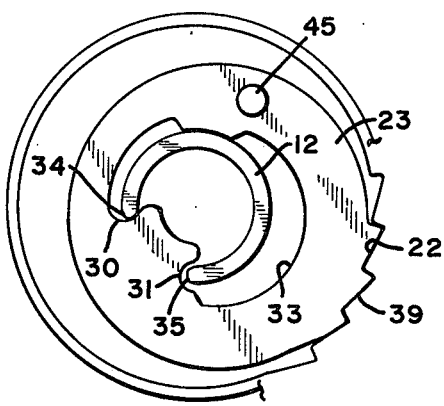
FIG. 4 is a view similar to FIG. 3 showing the locking dog in locking position.
Figure 6:
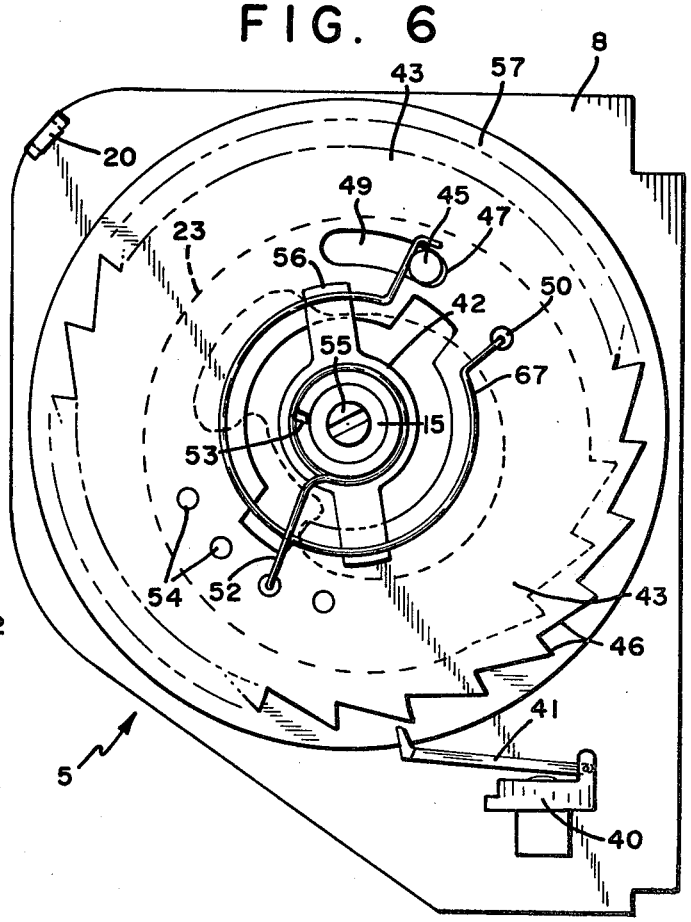
FIG. 6 is an elevation view of the retractor with the cover removed.

The locking dog 23 has an opening 28 therein and a projection 29 into said opening. The projection 29 has a configuration including concave side surfaces 30, 31 and rounded edges joining said side surfaces with a top surface 32 and the internal surfaces 33 of the opening 28. The side surfaces 30, 31 mate with edges 34, 35 of tube slot 36. A significant portion (e.g. 10°–60°) of the internal surface 33 comprises a bearing surface 37 having an arcuate configuration with a radius substantially equal to the radius of the outer peripheral surface 38 of tube reel 12. In addition, the locking dog 23 has teeth 39 designed to mate in locking relationship with teeth 22 when the locking dog 23 is in its activated locking position as shown in FIG. 4. Preferably, there is an equal number and configuration of teeth 22 and 39, and lock dog 23 may be cut from the same blank as ring 21 to conserve material.

An inertial deceleration sensing device 40 with locking pawl 41 is also mounted on side wall 8. Presently preferred is the device disclosed in U.S. Pat. application Ser. No. 915,695, filed June 15, 1978.

Retainer mechanism 42 is secured to end of tube 12 to retain locking dog 23 in axial position on tube reel 12, and serves as a bearing surface for shaft 15. Actuating ratchet wheel 43 is freely rotatably mounted on end portion 44 of shaft 15. Wheel 43 is connected to locking dog 23 through outwardly projecting pin 45 mounted on locking dog 23 and mating in slot 49 in wheel 43.

Actuating ratchet wheel 43 has teeth 46 adapted to be engaged by pawl 41. Clutch spring 67 is fixed at one end at hole 50 and at its other end to pin 45 to continually urge pin 45 against end 47 of slot 49. This connection allows for absorption of any shock due to mismating of teeth 22, 39.

Web sensing spring 52 is fixed at one end to slot 53 in retainer 42 and at its other end to one of four holes 54. Depending on the hole into which the spring end is inserted, the responsiveness to locking upon reel acceleration can be varied.

Screw 55 secured retainer 42 onto end 44 of shaft 15 and flanges 56 retain wheel 43 in axial position on shaft end 44. A housing member 57 via its snap in attachments 58 aids in securing the assembly in position. Cover 59 is secured to wall 8 with rivets 60.

Webbing spool 61 surrounds tube 12 to provide a spool for webbing 62. Washer 64 fits over end 65 of shaft 15 and inside tube 12 as an aid against deformation of tube 12.

Belt 62 is secured to reel tube 12 by inserting the belt into slot 36 around shaft 15 where it is trapped against withdrawal by wedge bar 63.

To assemble the seat belt retractor of the present invention, the operative parts can be generally assembled by a stacking action, sliding one into position next to the other. This feature and the simplicity of the retractor itself provides a low cost but reliable, dual sensitive automatic locking retractor.

Figure 2:
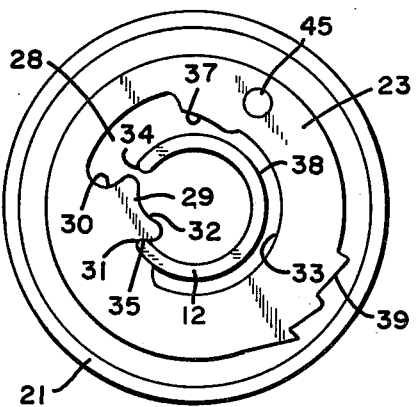
FIG. 2 is a schematic elevation view of the locking mechanism of the invention.
Figure 5:
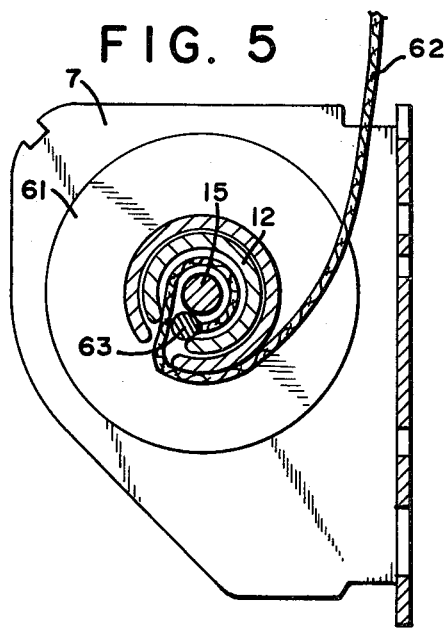
FIG. 5 is a sectional view showing the relationship of the belt to the reel.
Figure 3:
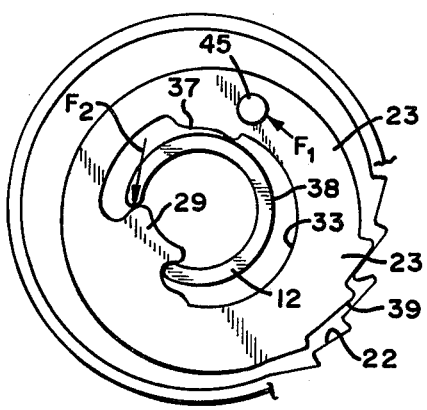
FIG. 3 is a view similar to FIG. 2 showing the locking dog in an intermediate position.

In operation, the locking means is activated in either of two ways. If the reel tube 12 is accelerated by a sudden pull on the belt 62, the heavier inertial moment of actuating wheel 43 causes it to resist movement and thereby apply force "$F_1$" against the pin 45 (via end 47 of slot 49) as shown in FIG. 3, thereby causing the locking dog 23 to rotate relative to tube 12 by reason of the force "$F_2$" on the locking dog through edge 34 of reel tube 12. The motion of the locking dog 23 into engagement with the teeth 22 of locking ring 21 can be seen by reference to FIGS. 2–4.

The other way of locking the reel so as to prevent further extraction of the belt is initiated by sudden deceleration or acceleration of the vehicle to actuate sensor 40, thereby moving pawl 41 into engagement with ratchet teeth 46 which will lock the wheel 43 and pin 45 against further movement thereby causing the locking dog 23 to move into locking engagement with ring 21 upon the slightest withdrawal of belt 62 and consequent movement of reel 12. Either or both (preferably both) of these mechanisms can be built into the invention.

The device of the invention provides a device which is economical, yet effective. The tubular slotted configuration of reel tube 12 allows it to be easily formed from sheet stock and at the same time provides a slot to allow easy assembly of the belt to the reel and provides a bearing surface and actuating mechanism for locking dog 23 adjacent the outer edge of the reel, so as to get improved leverage acting on locking dog 23 to improve the realiability of the locking mechanism. In addition, the forces acting to maintain the locking dog in locked position are spread over a substantial portion of the surface of the tube reel via bearing surface 37.

Having thus described the invention, but without wishing to be limited, what is claimed is:

1. A device comprising
   (a) a base;
   (b) a winding reel comprising a generally cylindrical hollow tube mounted for rotation on said base and having a slot extending substantially along the length thereof, said slot having a first edge and a second edge;
   (c) a locking dog having teeth and being mounted adjacent the external peripheral surface of said tube for rotation relative thereto;
   (d) a locking ring on said base disposed in potential mating relationship with said locking dog;
   (e) said locking dog having an opening therein and a projection into said opening, said opening fitting over one end of said tube with the projection fitting into mating relationship with said slot;
   (f) at least a significant portion of the inner surface of said opening having a configuration that conforms with the outer surface of said tube;
   (g) actuating means rotatably mounted with respect to said tube and being connected to said locking dog at a point radially spaced from the axis of the tube and removed from said projection whereby movement of said actuating means relative to said locking dog causes the tube to rotate into engagement with said locking ring.

2. Device of claim 1 wherein the base has unstanding side walls having bearings mounted thereon to provide bearing surfaces for the cylindrical hollow tube.

3. Device of claim 2 wherein a shaft extends through the center of said cylindrical hollow tube and is secured against rotation relative thereto.

4. Device of claim 3 including a spring and cover mounted on one of said side walls, said spring being articulated to said shaft to urge the shaft, reel and belt into the retracted rolled up condition.

5. Device of claim 2 wherein said locking dog has a plurality of teeth on the external surface thereof and wherein the opening in said locking dog is defined by a generally arcuate surface, interrupted by a projection having concave sides, and rounded edges at the top thereof and at its juncture with said arcuate surfaces, and a bearing surface remote from said projection and having essentially the same radius as the peripheral surface of said tube.

6. Device of claim 5 including a locking ring mounted on the second of said side walls and having teeth on the internal surface thereof for mating relationship with said teeth of said locking dog.

7. Device of claim 6 wherein the actuating means is rotatably mounted on said shaft and wherein said locking dog includes an outwardly projecting pin mating with a slot in the actuating means whereby rotational movement of the tube relative to said actuating means causes the projection to engage one edge of said slot and move said locking dog about said pivotal connection into locking engagement with the locking ring; and at substantially the point of locking, the peripheral surface of the tube comes into mating relationship with said bearing surface to provide additional force against said locking dog to maintain it in locked relationship with said locking ring, said relative movement being caused by a retarded movement of said actuating means caused by the inertia thereof relative to tube acceleration and/or by an inertial sensor being actuated by decleration of the vehicle to lock said actuating means against further rotational movement.

8. Device of claim 7 wherein the retarded movement of the actuating means is caused by the inertial sensor alone.

9. An emergency locking seat belt retractor comprising:
   (a) a base including upstanding side walls having plastic bearings mounted thereon to provide bearing surfaces;
   (b) a winding reel comprising a cylindrical hollow tube mounted for rotation on said bearings having a slot extending substantially along the length thereof, said slot having a first edge and a second edge;
   (c) a shaft extending through the center of said tube, and secured against rotation relative to said reel;
   (d) a spring and cover mounted on one of said side walls; said spring being articulated to said shaft to urge the shaft, reel and belt into the retracted rolled up condition;
   (e) a locking dog having a plurality of teeth on the external surface thereof and having an opening therein, said opening being defined by a generally arcuate surface, interrupted by: (i) a projection having concave sides and rounded edges at the top thereof and its juncture with said arcuate surfaces, and (ii) a bearing surface remote from said projection and of essentially the same radius as the peripheral surface of said tube;
   (f) a locking ring mounted on the second of said side walls and having teeth on the internal surface thereof for mating relationship with said teeth of said locking dog;
   (g) said locking dog being mounted adjacent the peripheral surface of one end of the tube with the projection fitting into mating relationship to said slot;
   (h) an actuating ratchet wheel rotatably mounted on said shaft for rotating movement relative to said locking dog; a pivotal connection between said locking dog and said actuating ratchet wheel; the pivotal connection on the locking dog being at a point radially external to the outer peripheral surface of the tube and remote from the projection, whereby rotating movement of the tube relative to said actuating ratchet wheel causes one edge of said slot to engage the projection and move said locking dog about said pivotal connection into locking relationship with the locking ring; and at the point of locking, the peripheral surface of the tube comes into mating relationship with said bearing surface to provide additional force against said locking dog to maintain it in locked relationship with said locking ring,
   said relative movement being caused by a retarded movement of said actuating means caused by the inertia thereof relative to reel tube accelerations and/or by an inertial sensor being actuated by deceleration of the vehicle to lock said actuating means against further rotational movement.

10. A device comprising (a) a base;
(b) a winding reel mounted for rotation on said base and having a slot therein, said slot having a first edge and a second edge;
(c) a locking dog having teeth and being mounted adjacent the external peripheral surface of said reel for rotation relative thereto;
(d) a locking ring on said base disposed in potential mating relaionship with said locking dog;
(e) said locking dog having an opening therein and a projection into said opening, said opening fitting over one end of said tube with the projection fitting into mating relationship with said slot;
(f) at least a significant portion of the inner surface of said opening having a configuration that conforms with the outer surface of said reel;
(g) actuating means rotatably mounted with respect to said reel and being connected to said locking dog at a point radially spaced from the axis of the reel and remote from said projection whereby movement of said activating means relative to said locking dog causes the reel to rotate into engagement with said locking ring.

* * * * *

UNITED STATES PATENT AND TRADEMARK OFFICE
CERTIFICATE OF CORRECTION

PATENT NO. : 4,168,810
DATED : September 25, 1979
INVENTOR(S) : J. J. Sack, A. Colasanti, and R. L. Stephenson It is certified that error appears in the above-identified patent and that said Letters Patent are hereby corrected as shown below:

Column 1, line 41, "comressing" should read -- compressing --.

Column 4, line 25, "secured" should read -- secures --.

Column 5, line 4, "realiability" should read -- reliability --;
line 32, "removed" should read -- remote --;
line 36, "unstanding" should read -- upstanding --.

Column 6, line 6, "decleration" should read -- deceleration --.

Column 7, line 9, "relaionship" should read -- relationship --.

Column 8, line 10, "activating" should read -- actuating.

Signed and Sealed this

Eighteenth Day of December 1979

[SEAL]

Attest:

SIDNEY A. DIAMOND

Attesting Officer

Commissioner of Patents and Trademarks

UNITED STATES PATENT AND TRADEMARK OFFICE
CERTIFICATE OF CORRECTION

PATENT NO. : 4,168,810

DATED : September 25, 1979

INVENTOR(S) : J.J. Sack, A. Colasanti, and R.L. Stephenson

It is certified that error appears in the above-identified patent and that said Letters Patent are hereby corrected as shown below:

Column 5, line 34, change "locking dog" to -- tube --;

Column 5, line 34, change "tube" to -- locking dog --.

Column 8, line 11, change "locking dog" to -- reel --;

Column 8, line 11, change "reel" to -- locking dog --.

Signed and Sealed this

Fifteenth Day of September 1981

[SEAL]

Attest:

Attesting Officer

GERALD J. MOSSINGHOFF

Commissioner of Patents and Trademarks